United States Patent
Poon et al.

(10) Patent No.: US 10,243,416 B2
(45) Date of Patent: Mar. 26, 2019

(54) MOTOR

(71) Applicant: JOHNSON ELECTRIC INTERNATIONAL AG, Murten (CH)

(72) Inventors: Ping Wo Poon, Hong Kong (CN); Tian Wen Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 399 days.

(21) Appl. No.: 15/067,674

(22) Filed: Mar. 11, 2016

(65) Prior Publication Data

US 2016/0268864 A1    Sep. 15, 2016

(30) Foreign Application Priority Data

Mar. 12, 2015    (CN) .......................... 2015 1 0108965

(51) Int. Cl.
| | |
|---|---|
| H02K 5/10 | (2006.01) |
| H02K 5/02 | (2006.01) |
| H02K 1/17 | (2006.01) |
| H02K 1/02 | (2006.01) |
| H02K 1/04 | (2006.01) |
| H02K 11/00 | (2016.01) |

(52) U.S. Cl.
CPC .................. *H02K 1/02* (2013.01); *H02K 1/04* (2013.01); *H02K 11/00* (2013.01); *H02K 5/02* (2013.01)

(58) Field of Classification Search
CPC . H02K 11/00; H02K 1/02; H02K 1/04; H02K 5/02
USPC .................................................... 310/216.057
See application file for complete search history.

(56) References Cited

U.S. PATENT DOCUMENTS

| | | | |
|---|---|---|---|
| 7,874,061 B2 | 1/2011 | Murata | |
| 2006/0087183 A1 | 4/2006 | Tanaka et al. | |
| 2007/0007844 A1* | 1/2007 | Barbat | H02K 53/00 310/208 |
| 2012/0080888 A1* | 4/2012 | Barbat | H02K 53/00 290/1 R |
| 2014/0159845 A1* | 6/2014 | Barbat | H02K 53/00 336/73 |
| 2015/0026966 A1* | 1/2015 | Fang | H02K 1/276 29/598 |

FOREIGN PATENT DOCUMENTS

| | | | |
|---|---|---|---|
| CN | 101938181 | 1/2011 | |
| JP | 2006129558 A * | 5/2006 | ............... H02K 5/02 |
| JP | 2007 224334 | 9/2007 | |

OTHER PUBLICATIONS

Translation of foreign document JP 2007224334 A (Year: 2007).*

* cited by examiner

*Primary Examiner* — Alex W Mok
(74) *Attorney, Agent, or Firm* — Muncy, Geissler, Olds & Lowe, P.C.

(57) ABSTRACT

An electric motor includes a stator and a rotor. One of the stator and the rotor includes a magnetic core, preferably an iron core. A reactive metal or a mixture or reactive metals is fixed to the magnetic core. The or each reactive metal has a reactivity greater than the reactivity of the metal of the magnetic core. A rotor and a stator is also provided. By fixing the reactive metal or metal mixture to the magnetic core of the motor, rotor or stator, oxidation and corrosion of the core can be avoided or reduced.

8 Claims, 8 Drawing Sheets

MOTOR

CROSS REFERENCE TO RELATED APPLICATIONS

This non-provisional patent application claims priority under 35 U.S.C. § 119(a) from Patent Application No. 201510108965.7 filed in The People's Republic of China on Mar. 12, 2015, the entire contents of which are hereby incorporated by reference.

FIELD OF THE INVENTION

The present invention relates to an electric motor and in particular, to a motor with anti-oxidation protection.

BACKGROUND OF THE INVENTION

Conventional electric motors include a rotor and a stator. One or both of the rotor and the stator usually includes a magnetic core. The main ingredient of the magnetic core is iron which can easily be oxidized in air to produce iron oxide or rust, which affects the appearance of the magnetic core and the performance of the motor. Currently, tinplating is mainly used to prevent iron oxidation. However, tinplating severely pollutes water. In addition, tin is usually plated on the surface of the iron core and, as a result, those surface sections that are not tinplated can be easily oxidized. Moreover, tinplating is an expensive process.

SUMMARY OF THE INVENTION

Hence there is a desire for an electric motor with corrosion protection.

Accordingly, in one aspect thereof, the present invention provides an electric motor comprising a stator and a rotor, wherein one of the stator and the rotor comprises: a magnetic core made from a magnetically conductive material having a reactivity; and at least one reactive metal fixed to the magnetic core, wherein the reactive metal has a reactivity greater than the reactivity of the magnetically conductive material of the magnetic core.

Preferably, the magnetic core has multiple teeth arranged in the circumferential direction, each tooth defines a through hole extending in the axial direction, the at least one reactive metal forms a plurality of inserts, and each insert is fixed in a respective through hole of the teeth.

Alternatively, the magnetic core includes a plurality of core laminations, the at least one reactive metal forms a plurality of metal laminations, the metal laminations have a shape matching the shape of the core laminations, and the metal laminations and the core laminations are stacked together.

Preferably, the metal laminations and the core laminations are alternately disposed and stacked.

Alternatively, the magnetic core includes a plurality of core laminations, the at least one reactive metal forms a metal coating, and the metal coating is coated on at least one surface of each core lamination.

Preferably, the reactive metal is one of zinc, aluminum and magnesium.

Preferably, the at least one reactive metal is a mixture of reactive metals.

Preferably, the mixture of reactive metals is any combination of zinc, aluminum and magnesium.

Preferably, the reactive metal mixture contains 91% zinc, 6% aluminum and 3% magnesium.

Preferably, the material of the magnetic core comprises iron.

According to a second aspect, the present invention provides a rotor comprising: a shaft; a magnetic core mounted to the shaft, the magnetic core comprising a magnetically conductive material having a reactivity; and a reactive metal or a mixture of reactive metals fixed to the magnetic core, wherein the or each reactive metal has a reactivity greater than the reactivity of the magnetically conductive material of the magnetic core.

According to a third aspect, the present invention provides a stator comprising: a magnetic core formed of a magnetically conductive material having a reactivity; and a reactive metal or a mixture of reactive metals fixed to the magnetic core, the or each reactive metal having a reactivity greater than the reactivity of the magnetically conductive material of the magnetic core.

By fixing the reactive metal or mixture of reactive metals to the magnetic core, when the reactive metal or all metals in the metal mixture have a reactivity greater than the reactivity of the material of the magnetic core, oxidation of the magnetic core can be avoided. Therefore, the present invention not only avoids the pollution produced by tinplating, but can also prolong the lifespan of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
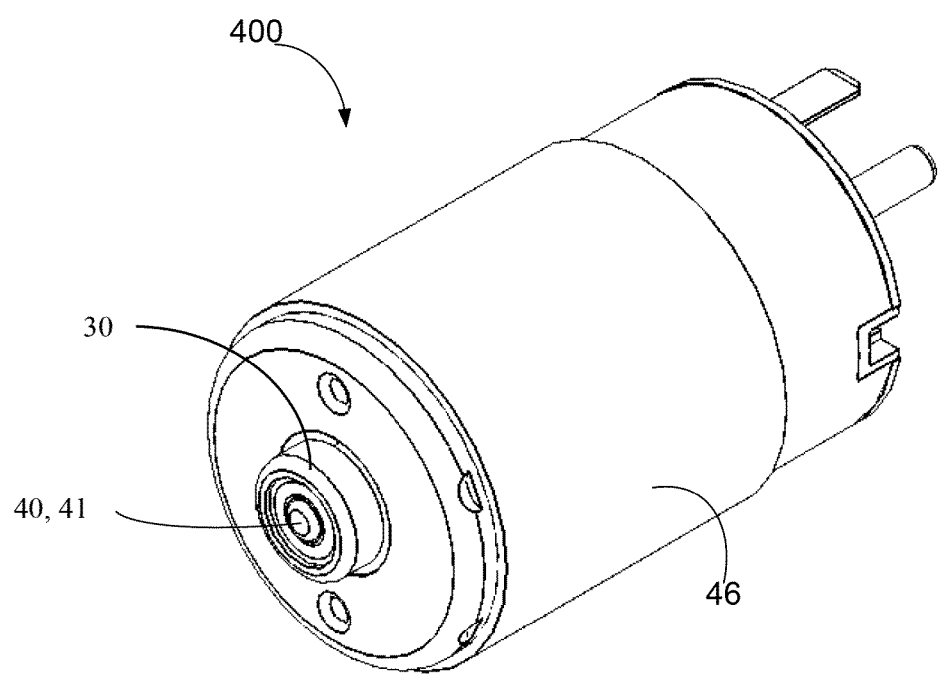
FIG. 1 illustrates a motor according to the present invention.

FIG. 1 shows a motor 400 according to an embodiment of the present invention. The motor includes a stator 46 and a rotor 40 of which only the shaft 41 is visible.

Figure 2:
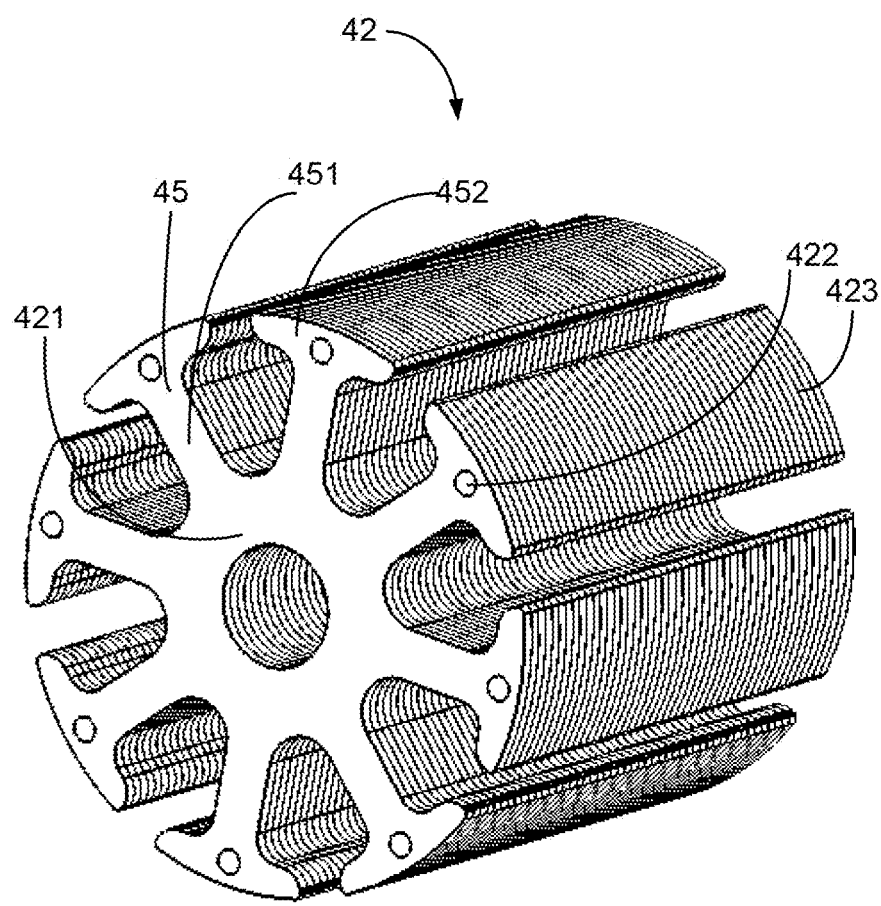
FIG. 2 illustrates a rotor core of the motor of FIG. 1.

Referring also to FIG. 2, in a first embodiment, the rotor 40 has a magnetic core 42 fixed to the shaft 41. The core 42 is made from a magnetically conductive material such as iron. The stator 46 includes a housing and a plurality of permanent magnets (not shown) disposed on an inner surface of the housing. The shaft 41 is mounted to the housing via a bearing 30. While the rotor has eight poles in this embodiment, the number of poles may vary according to needs.

Figure 3:
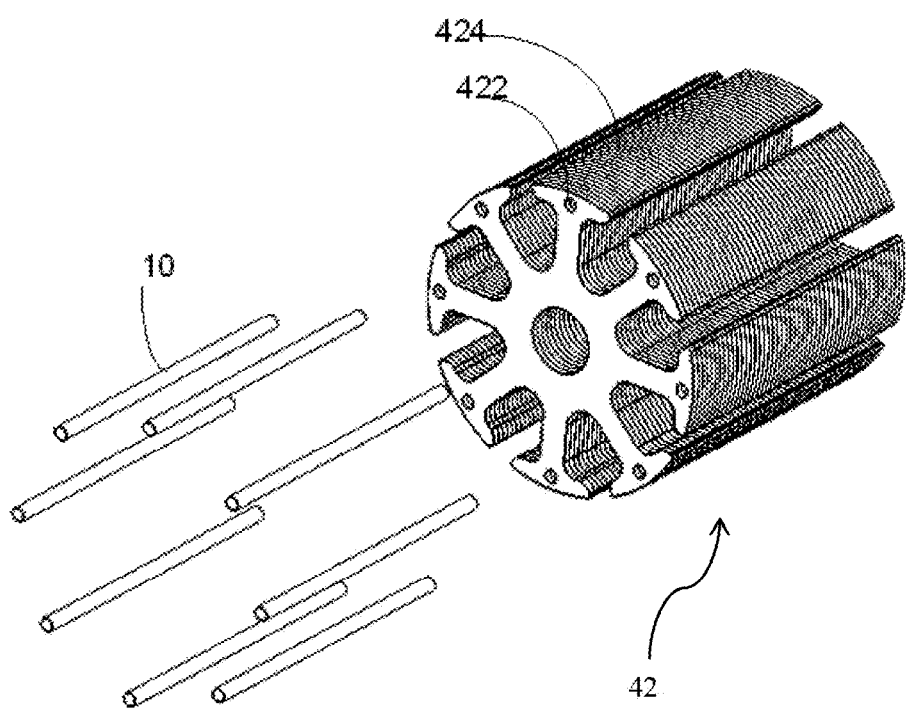
FIG. 3 shows inserts to be inserted into the rotor core of FIG. 2.

Referring also to FIG. 3, a reactive metal or a mixture of reactive metals is fixed to the core 42. The term reactive metal normally refers to a metal which forms a reaction with acid or water. However, in the present invention, the term reactive metal excludes those metals that react with water. The or each reactive metal has a reactivity which is greater than the main material of the magnetic core. In the preferred embodiments, the material of the core is iron and thus the preferred reactive metals are zinc, aluminum and magnesium. Other reactive metals may be titanium, chromium, manganese and beryllium. The reactivity of the other metals must be greater than the reactivity of the metal in the iron core 42, and must not react with water. For example, the other metals may be tungsten, chromium, manganese, beryllium, . Other reactive metals, such as calcium, potassium, sodium and barium, have a higher reactivity than iron but they react with water and, therefore, are not suitable to be used as the reactive metal in this invention.

The iron core 42 forms multiple teeth 45 arranged in the circumferential direction. Each tooth 45 has a through hole 422 extending in the axial direction. In the first embodiment, the reactive metal or metal mixture is provided in the form of a plurality of inserts 10 that are fixed in the through holes 422 of the teeth 45. In this embodiment, the inserts are in the form of pins. The inserts may have another shape and length according to requirements of the particular embodiment. Because the core 42 is formed by multiple core laminations 423 (FIG. 6) stacked in the axial direction, a space 424 exists between adjacent core laminations 423. When the inserts 10 pass through the through hole 422, the inserts 10 are partially exposed through the spaces 424 formed between the core laminations 423, thereby avoiding oxidation of the iron core 42.

The principle of avoiding iron core oxidation through the reactive metal is described as follows. The main ingredient of the magnetic core 42 is iron. Because the reactivity of the reactive metal or metals is greater than the reactivity of iron, the reactive metal or metals react with oxygen in the air to lose electric charges prior to the reaction of the iron core. Taking zinc as an example, zinc reacts with ions in the air to lose electric charges and forms zinc ions with positive charges, and the iron core reacts with the oxygen in the air to lose electric charges and forms iron ions with positive charges after the reaction of the reactive metal or the metal mixture. At this time, negative charges exists in the air, and the iron ions regains the negative charges to become iron atoms, thus avoiding the iron core to be oxidized to iron oxide. That is, the production of rust is avoided, which enhances the anti-oxidation and anti-corrosion capabilities of the motor.

In this embodiment, each tooth 45 includes a neck 451 extending radially from a core center 421, and a circumferentially-extending tip 452 fixed to an outer end of the neck 421. The through hole 422 is defined in the tip 452. In another embodiment, the through hole 422 may be defined in the neck 421.

Figure 4:
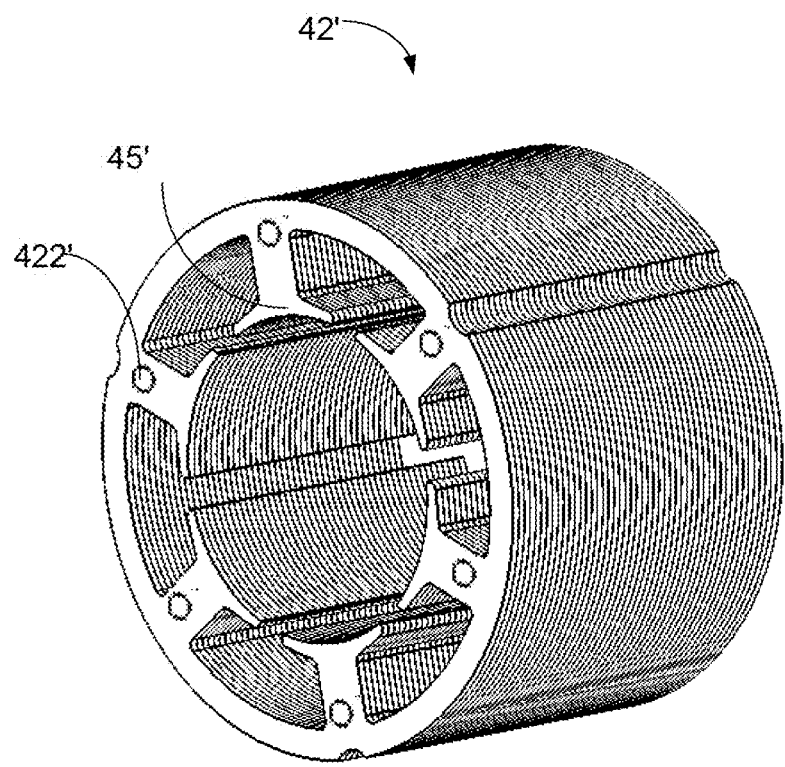
FIG. 4 illustrates a stator core of the motor of FIG. 1.
Figure 5:
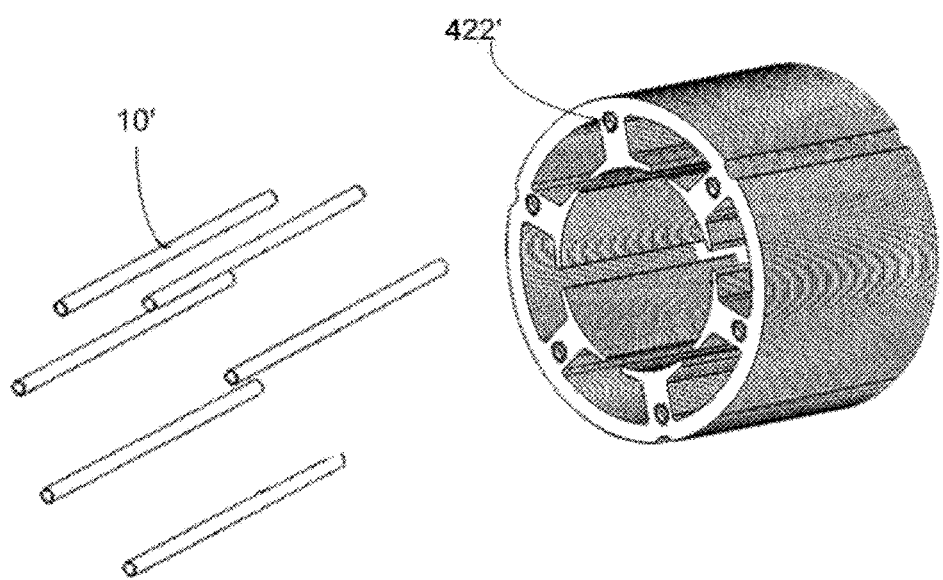
FIG. 5 shows inserts to be inserted into the stator core of FIG. 4.

Referring also to FIG. 4 and FIG. 5, in a second embodiment, a stator 46 of the motor 400 includes a magnetic core 42', preferably also made of iron. A corresponding rotor 40 includes a plurality of permanent magnets (not shown). The core 42' has multiple teeth 45' arranged in the circumferential direction. Each tooth 45' defines a through hole 422' extending in the axial direction. Inserts 10' of reactive metal or metal mixture are fixed in the through holes 422'. While the core of the stator has six poles in this embodiment, the number of poles can vary according to needs.

Figure 6:
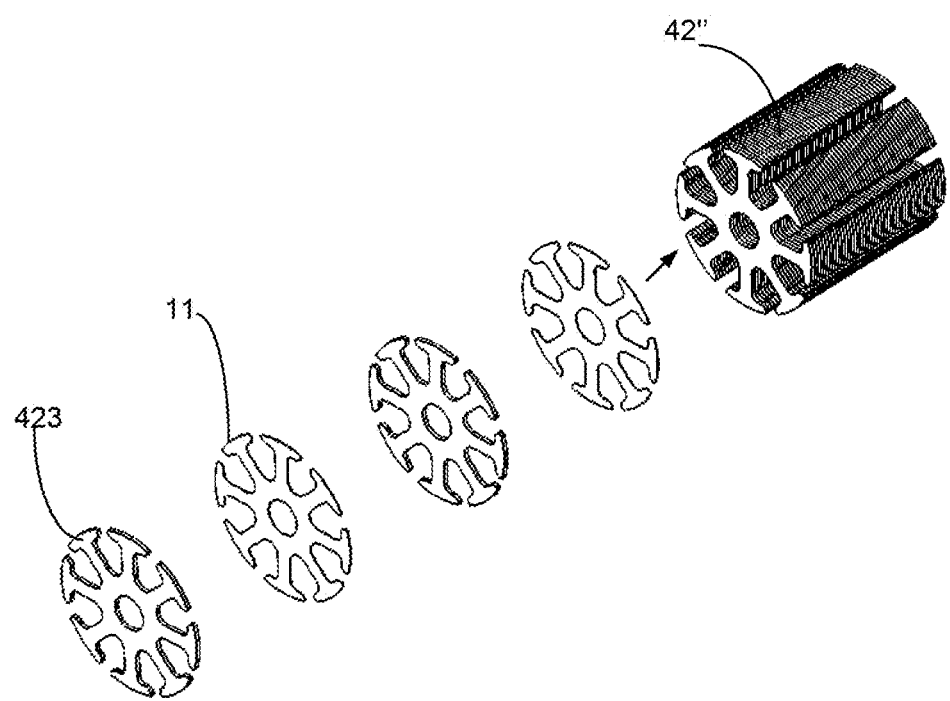
FIG. 6 illustrates a stacking of core laminations and metal laminations for a rotor core.
Figure 7:
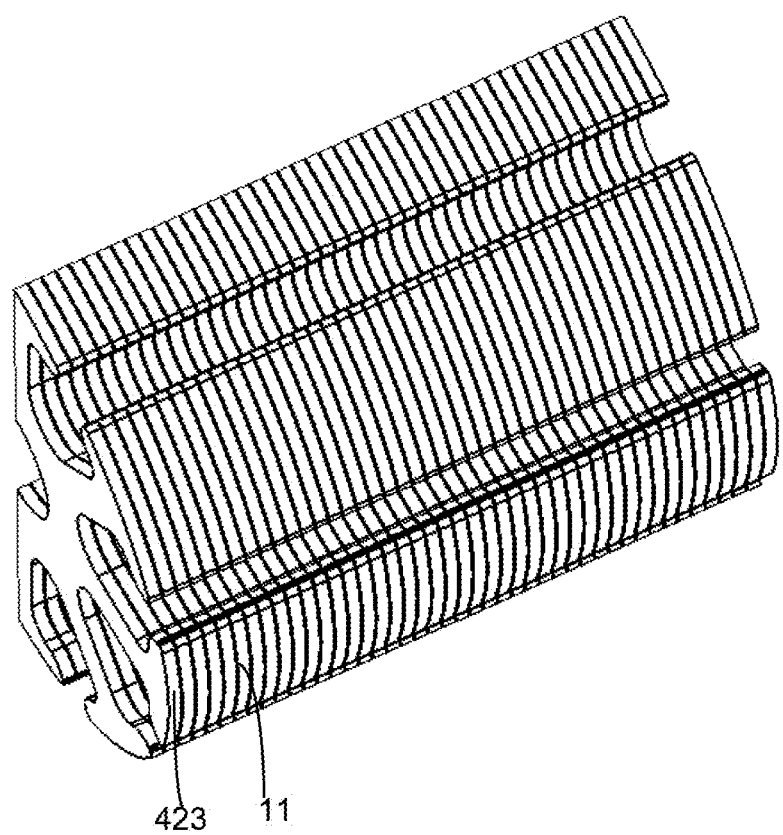
FIG. 7 is an enlarge view of a part of a magnetic core formed by the stacking shown in FIG. 6.

Referring to FIG. 6 and FIG. 7, in another embodiment, the rotor has a magnetic core 42" having a plurality of core laminations 423. The reactive metal or metal mixture is in the form of a plurality of metal laminations 11. Each metal lamination 11 has a shape matching the core lamination 423. However, the metal lamination 11 has a thickness far less than the thickness of the core lamination 423. The thickness of the metal lamination 11 is sized to not affect the magnetic performance of the core 42". The metal laminations 11 and the core laminations 423 are alternately stacked in the axial direction to form the magnetic core 42". In this embodiment, in stacking the metal laminations 11 and the core laminations 423, the core laminations 423 are disposed at odd number positions, and the metal laminations 11 are disposed at even number positions. Alternatively, the core laminations 423 and the metal laminations 11 may be arranged and stacked in the reverse order or in a random order.

In another embodiment, the stator magnetic core 42' of FIG. 4 may also include a plurality of core laminations and metal laminations formed of one or more reactive metals. Again, the shape of the metal lamination matches the shape of the core lamination and the thickness of the metal lamination is sized to not affect the magnetic perfoitnance of the core 42'. Preferably, the metal laminations and the core laminations are alternately stacked to form the magnetic core.

Figure 8:
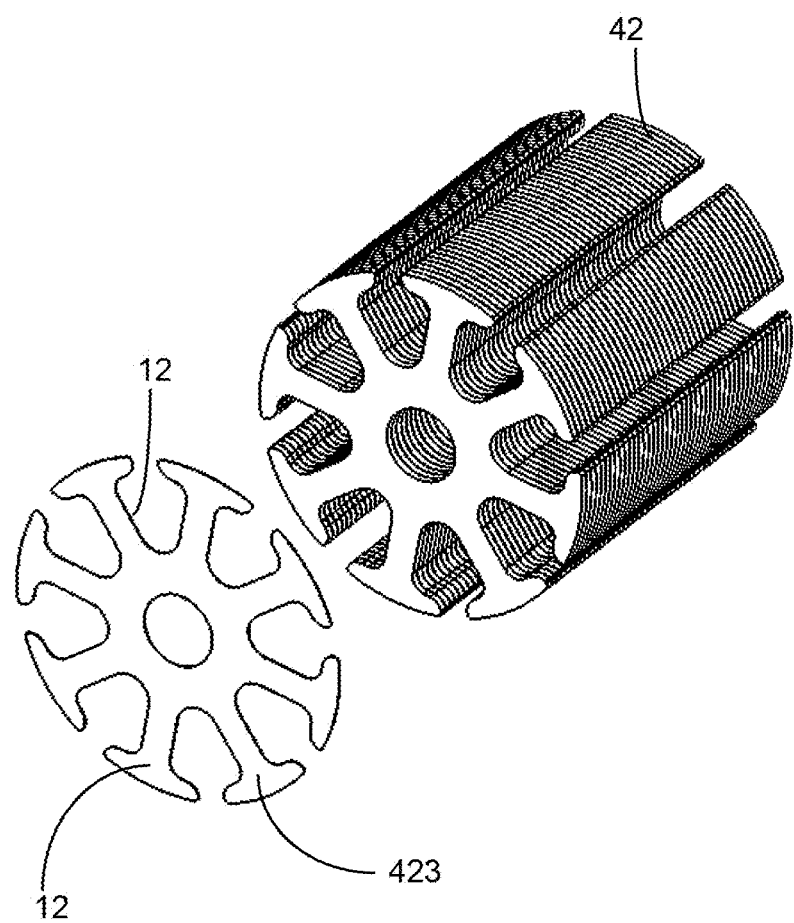
FIG. 8 illustrates a core lamination coated with a reactive metal coating.

Referring to FIG. 8, in another embodiment, the core 42 is formed by stacking together core laminations 423. The reactive metal or metal mixture forms a metal coating 12. The metal coating 12 is coated on one or both surfaces of opposite sides of each core lamination 423. In this embodiment, the metal mixture contains 91% zinc, 6% aluminum and 3% magnesium. In another embodiment, the percentage of each metal in the reactive metal mixture may vary according to needs. In another embodiment, front and back surfaces of a raw material may be coated with the metal coating 12 before the raw material is punched to form the core laminations 423. In this case, after the raw material is punched, the front and back sides of the punched core lamination 423 is already coated with the metal coating 12. In still another embodiment, a pole face of the core 42 may be coated with the metal coating 12. The metal coating 12 may be applied by roll painting or spray painting. In addition, the metal coating 12 of the present invention is formed by painting rather than electroplating. Therefore, the metal coating 12 does not have a hydrogen embrittlement issue and is environmentally friendly. In another embodiment, the core 42' of FIG. 4 may also be formed by a stack of core laminations having a reactive metal coating 12 as described above. Preferably, the metal coating 12 is applied on both sides of each iron core lamination.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor comprising a stator and a rotor, wherein one of the stator and the rotor comprises:
   a magnetic core made from a magnetically conductive material having a reactivity, and comprising a plurality of core laminations;
   wherein the core lamination has two opposite end surfaces in an axial direction of the electric motor,
   a metal coating is directly coated on at least one end surface of the core lamination, and
   a material of the metal coating is a mixture of zinc, aluminum and magnesium, the mixture having a reactivity greater than the reactivity of the magnetically conductive material of the magnetic core.

2. The motor of claim 1, wherein the metal coating is coated by roll painting or spray painting.

3. The motor of claim 1, wherein the material of the metal coating contains 91% zinc, 6% aluminum and 3% magnesium.

4. The motor of claim 1, wherein the magnetic core is made from iron.

5. A stator comprising:
   a magnetic core formed of a magnetically conductive material having a reactivity, and comprising a plurality of core laminations; and
   wherein the core lamination has two opposite end surfaces in an axial direction of the stator,
   a metal coating is directly coated on at least one end surface of the core lamination, and
   a material of the metal coating is a mixture of zinc, aluminum and magnesium, the mixture having a reactivity greater than the reactivity of the magnetically conductive material of the magnetic core.

6. The stator of claim 5, wherein the material of the metal coating contains 91% zinc, 6% aluminum and 3% magnesium.

7. The stator of claim 5, wherein the magnetic core is made from iron.

8. An electric motor comprising a stator and a rotor, wherein one of the stator and the rotor comprises:
   a magnetic core made from a magnetically conductive material having a reactivity; and
   at least one reactive metal fixed to the magnetic core,
   wherein the reactive metal has a reactivity greater than the reactivity of the magnetically conductive material of the magnetic core; and
   wherein the magnetic core has multiple teeth arranged in the circumferential direction, each tooth defines a through hole extending in an axial direction of the electric motor, the at least one reactive metal forms a plurality of inserts, and each insert is fixed in a respective through hole of the teeth.

* * * * *